United States Patent
Chien et al.

(10) Patent No.: US 9,851,876 B2
(45) Date of Patent: Dec. 26, 2017

(54) METHOD, APPARATUS AND COMPUTER-READABLE MEDIUM FOR ADJUSTING SIZE OF SCREEN OBJECT

(71) Applicant: HTC Corporation, Taoyuan County (TW)

(72) Inventors: Chih-Ling Chien, Taoyuan County (TW); Chia-Chia Shieh, Taoyuan County (TW); Yen-Shun Wu, Taoyuan County (TW); Ting-An Yang, Taoyuan County (TW); Ju-Wei Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 189 days.

(21) Appl. No.: 13/909,108

(22) Filed: Jun. 4, 2013

(65) Prior Publication Data

US 2013/0346894 A1 Dec. 26, 2013

Related U.S. Application Data

(60) Provisional application No. 61/654,968, filed on Jun. 4, 2012.

(51) Int. Cl.
*G06F 3/0484* (2013.01)
*G06F 3/0488* (2013.01)

(52) U.S. Cl.
CPC ........ *G06F 3/04842* (2013.01); *G06F 3/0488* (2013.01); *G06F 3/04886* (2013.01)

(58) Field of Classification Search
CPC ...... G06F 9/4443; G06F 3/0481; G06F 3/017; G06F 3/041; G06F 2203/04808

(Continued)

(56) References Cited

U.S. PATENT DOCUMENTS 6,043,817 A * 3/2000 Bolnick ............... G06F 3/0481
715/788
8,555,185 B2 * 10/2013 Louch .................. G06F 3/0481
715/769

(Continued)

FOREIGN PATENT DOCUMENTS

CN 102270081 12/2011
CN 102339192 2/2012

(Continued)

OTHER PUBLICATIONS

"Office Action of Taiwan Counterpart Application," dated Feb. 10, 2015, p. 1-p. 11.

(Continued)

*Primary Examiner* — Alvin Tan
(74) *Attorney, Agent, or Firm* — JCIPRNET

(57) ABSTRACT

A method, an apparatus and a computer-readable medium for adjusting size of screen object adapted to a mobile device having a touch screen are provided. In the method, a display direction is randomly selected for each of at least one screen object to display each screen object on the touch screen, where each screen object has at least one object size capable of being adjusted. Then, the touch screen is used to detect a first touch and a second touch performed on one of the at least one screen object. The object size of the screen object being touched is adjusted according to the display direction thereof and a relative moving direction of the first touch and the second touch.

14 Claims, 6 Drawing Sheets

(58) Field of Classification Search
USPC .......................................................... 715/765
See application file for complete search history.

(56) References Cited

U.S. PATENT DOCUMENTS

| | | | | |
|---|---|---|---|---|
| 2007/0022389 | A1* | 1/2007 | Ording | G06F 3/0481 715/790 |
| 2008/0036743 | A1* | 2/2008 | Westerman | G06F 3/038 345/173 |
| 2008/0115081 | A1* | 5/2008 | Sankaravadivelu | G06F 3/0481 715/783 |
| 2009/0259967 | A1* | 10/2009 | Davidson | G06F 3/0481 715/799 |
| 2010/0083109 | A1* | 4/2010 | Tse | A63F 13/10 715/702 |
| 2010/0083111 | A1 | 4/2010 | de los Reyes | |
| 2010/0146459 | A1* | 6/2010 | Repka | 715/863 |
| 2011/0145759 | A1* | 6/2011 | Leffert | G06F 3/04845 715/800 |
| 2011/0163971 | A1* | 7/2011 | Wagner et al. | 345/173 |
| 2012/0092381 | A1* | 4/2012 | Hoover | G06F 3/04883 345/662 |
| 2012/0166472 | A1* | 6/2012 | Hoppenot | G06F 3/041 707/769 |
| 2012/0169774 | A1* | 7/2012 | Yu | G06F 3/04883 345/661 |
| 2013/0069860 | A1* | 3/2013 | Davidson | 345/156 |

FOREIGN PATENT DOCUMENTS

| | | |
|---|---|---|
| CN | 102436343 | 5/2012 |
| TW | 200828089 | 7/2008 |
| TW | 201133307 | 10/2011 |

OTHER PUBLICATIONS

"Office Action of China Counterpart Application," dated Oct. 28, 2015, p. 1-p. 13.

* cited by examiner

METHOD, APPARATUS AND COMPUTER-READABLE MEDIUM FOR ADJUSTING SIZE OF SCREEN OBJECT

CROSS-REFERENCE TO RELATED APPLICATION

This application claims the priority benefits of U.S. provisional application Ser. No. 61/654,968, filed on Jun. 4, 2012. The entirety of the above-mentioned patent application is hereby incorporated by reference herein and made a part of this specification.

BACKGROUND

Technical Field

The invention relates to a method for display screen object. Particularly, the invention relates to a method, an apparatus and a computer-readable medium for adjusting size of screen object.

Related Art

Regarding a portable electronic apparatus requiring features of lightness, slimness, shortness and smallness, due to a volume limitation, if a screen and a keyboard are simultaneously configured to the apparatus, a size of the screen has to be reduced. In order to configure a larger screen in a limited space, most of the portable electronic apparatus manufacturers start to apply a touch screen to serve as an input interface of the portable electronic apparatus, so as to save the cost for configuring the conventional keyboard and save an area occupied by the same.

The operation method of the touch screen is simple and intuitive, and a user can place shortcuts and widgets of commonly used applications on a homescreen, and can select the same by using a stylus or through a direct finger press, so as to execute various functions. However, most of the screen objects displayed on the homescreen only support a single display size, and the user cannot arbitrarily adjust the size of the screen objects according to an actual need. Obviously, the above method of displaying the screen objects makes the homescreen to be lack of flexibility, and cannot satisfy a demand of designing exclusive homescreens by the user.

SUMMARY

The invention is directed to a method and an apparatus for adjusting size of screen object, by which an object size of a screen object is adjusted in response to a touch operation of a user.

The invention provides a method for adjusting size of screen object, which is adapted to a mobile device having a touch screen. In the method, a display direction is randomly selected for each screen object in at least one screen object to display the screen object on the touch screen, wherein each screen object has at least one object size capable of being adjusted. Then, the touch screen is used to detect a first touch and a second touch performed on one of the at least one screen object. The object size of the screen object being touched is adjusted according to a relative moving direction of the first touch and the second touch and the display direction of the screen object being touched.

The invention provides an apparatus for adjusting size of screen object including a touch screen, a storage unit and one or a plurality of processing units. The storage unit records a plurality of modules. The processing unit is coupled to the touch screen and the storage unit for accessing and executing the modules recorded in the storage unit. The modules include an object display module, a touch detecting module and an object size adjusting module. The object display module randomly selects a display direction for each screen object in at least one screen object to display the screen object on the touch screen, where each screen object has at least one object size capable of being adjusted. The touch detecting module uses the touch screen to detect a first touch and a second touch performed on one of the screen objects. The object size adjusting module adjusts the object size of the screen object being touched according to a relative moving direction of the first touch and the second touch and the display direction of the screen object being touched.

In an embodiment of the invention, the object size adjusting module enlarges the object size of the screen object being touched when the first touch and the second touch respectively move along a direction away from each other, and reduces the object size of the screen object being touched when the first touch and the second touch respectively move along a direction facing to each other.

In an embodiment of the invention, the object size adjusting module further determines whether the direction away from each other is parallel to or vertical to the display direction of the screen object being touched, and enlarges the object size of the screen object being touched along the display direction when the direction away from each other is parallel to the display direction of the screen object, and enlarges the object size of the screen object being touched along a vertical direction of the display direction when the direction away from each other is vertical to the display direction of the screen object being touched.

In an embodiment of the invention, the object size adjusting module further determines whether the direction facing to each other is parallel to or vertical to the display direction of the screen object being touched, and reduces the object size of the screen object being touched along the display direction when the direction facing to each other is parallel to the display direction of the screen object being touched, and reduces the object size of the screen object being touched along a vertical direction of the display direction when the direction facing to each other is vertical to the display direction of the screen object being touched.

In an embodiment of the invention, the object size adjusting module enlarges the object size of the screen object being touched according to a relative moving distance between the first touch and the second touch when the first touch and the second touch respectively move along the direction away from each other, and reduces the object size of the screen object being touched according to the relative moving distance between the first touch and the second touch when the first touch and the second touch respectively move along the direction facing to each other.

In an embodiment of the invention, the object size adjusting module enlarges the object size of the screen object being touched along the display direction according to a first component of a relative moving distance between the first touch and the second touch in the display direction of the screen object, and enlarges the object size of the screen object being touched along a vertical direction of the display direction according to a second component of the relative moving distance between the first touch and the second touch in the vertical direction of the display direction of the screen object being touched.

In an embodiment of the invention, the object size adjusting module reduces the object size of the screen object being touched along the display direction according to a first component of a relative moving distance between the first touch and the second touch in the display direction of the screen object, and reduces the object size of the screen object being touched along a vertical direction of the display direction according to a second component of the relative moving distance between the first touch and the second touch along the vertical direction of the display direction of the screen object being touched.

In an embodiment of the invention, when the object size adjusting module enlarges the object size of the screen object being touched, the object size adjusting module determines whether the screen object being touched has the object size larger than a current size and accordingly enlarges the object size of the screen object being touched, and when the object size adjusting module reduces the object size of the screen object, the object size adjusting module determines whether the screen object being touched has the object size smaller than the current size and accordingly reduces the object size of the screen object being touched.

In an embodiment of the invention, the apparatus for adjusting size of screen object further includes an editing module, which uses the touch screen to detect a third touch performed on one of the screen objects, and determines whether a touch duration of the third touch exceeds a predetermined duration, and enters an editing mode when the touch duration of the third touch exceeds the predetermined duration, so as to adjust the object size of the screen object being touched according to the relative moving direction of the first touch and the second touch and the display direction of the screen object being touched.

In an embodiment of the invention, the object size adjusting module further adjusts an object content of the screen object being touched, where the object content includes one or combination of a thumbnail, a widget, an operation panel, an image, and a video of the screen object being touched.

The invention provides a computer-readable medium for recording a program, and the program is loaded to a mobile device to execute following steps. A display direction is randomly selected for each screen object in at least one screen object to display the screen object on a touch screen, where each screen object has at least one object size capable of being adjusted. Then, the touch screen is used to detect a first touch and a second touch performed on one of the at least one screen object. The object size of the screen object being touched is adjusted according to a relative moving direction of the first touch and the second touch and the display direction of the screen object being touched.

According to the above descriptions, according to the method, the apparatus and the computer-readable medium for adjusting size of screen object, the screen object may be displayed on the touch screen according to a randomly selected display direction, and the object size of the screen object may be enlarged or reduced according to the display direction and the relative moving direction of the first touch and the second touch performed on the screen object. In this way, the screen object is not limited to a fixed display size, and may be adjusted to different object sizes according to user's operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
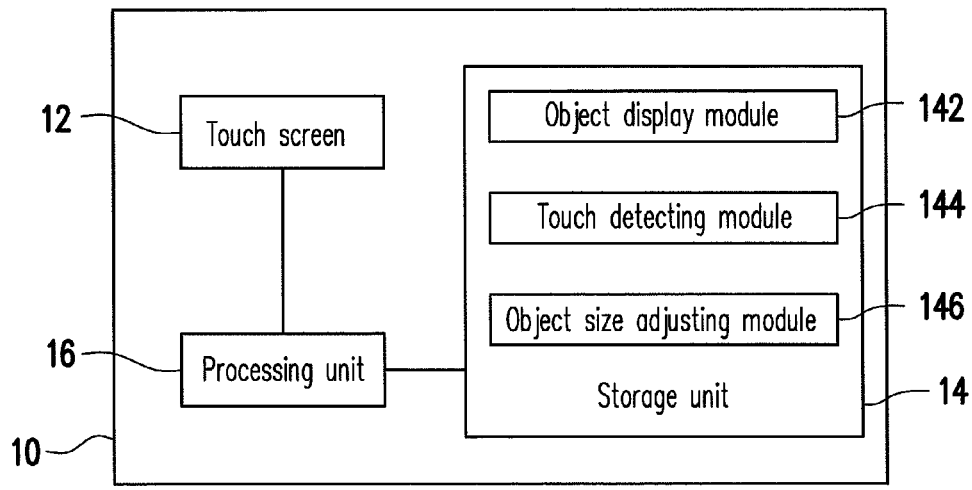
FIG. 1 is a block diagram of an apparatus for adjusting size of screen object according to an embodiment of the invention.

FIG. 1 is a block diagram of an apparatus for adjusting size of screen object according to an embodiment of the invention. Referring to FIG. 1, the apparatus for adjusting size of screen object 10 may be a combination of a hardware device and/or a software device configured in a mobile device, and the mobile device is, for example, a mobile phone, a smart phone, a personal digital assistant (PDA), a PDA mobile phone, a notebook computer or a tablet PC. The apparatus for adjusting size of screen object 10 includes a touch screen 12, a storage unit 14 and one or a plurality of processing units 16, and functions thereof are respectively described below.

The touch screen 12 is, for example, a resistive, a capacitive or other types of touch sensing device integrated with a liquid crystal display (LCD), which is capable of detecting a touch operation of a user while displaying images of the mobile device.

The storage unit 14 is, for example, a fixed or movable random access memory (RAM), read-only memory (ROM), flash memory, hard disk of any type or other similar devices or a combination of the above devices, which is used for recording a plurality of modules that may be executed by the processing unit 16, and these modules may be loaded to the processing unit 16 to implement the function of adjusting size of screen object.

The processing unit 16 is, for example, a central processing unit (CPU), or a programmable general purpose or special purpose microprocessor, a digital signal processor (DSP), a programmable controller, an application specific integrated circuit (ASIC), a programmable logic device (PLD) or other similar devices or a combination of these devices. The processing unit 16 is coupled to the touch screen 12 and the storage unit 14 and can access and execute the modules stored in the storage unit 14 to implement the function of adjusting size of screen object.

The aforementioned modules include an object display module 142, a touch detecting module 144 and an object size adjusting module 146, and theses modules are, for example, computer programs, and may be located to the processing unit 16 to implement the function of adjusting size of screen object. Embodiments are provided below to describe detailed steps of adjusting size of screen object executed by the apparatus for adjusting size of screen object 10.

Figure 2:
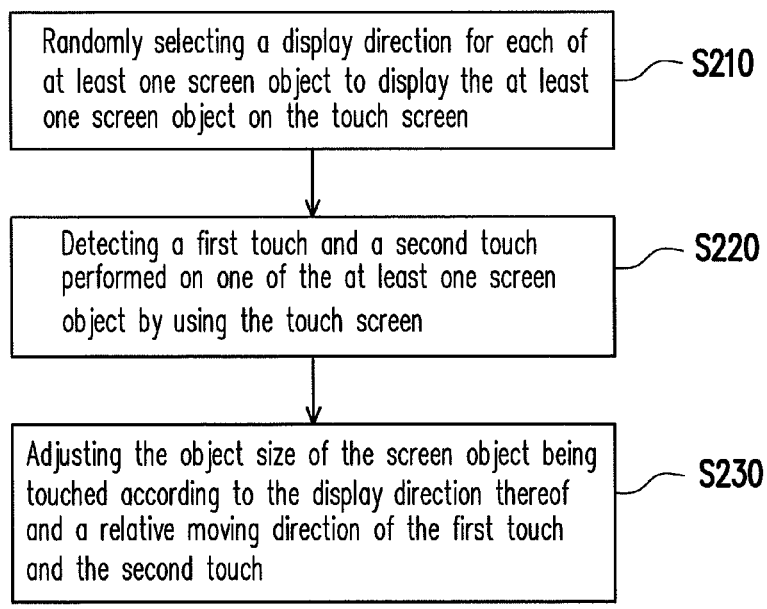
FIG. 2 is a flowchart illustrating a method for adjusting size of screen object according to an embodiment of the invention.

FIG. 2 is a flowchart illustrating a method for adjusting size of screen object according to an embodiment of the invention. Referring to FIG. 2, the method of the present embodiment is adapted to a mobile device configured with the apparatus for adjusting size of screen object 10, and detailed steps of adjusting size of screen object are described below with reference of various components of the apparatus for adjusting size of screen object 10.

First, in step S210, the object display module 142 randomly selects a display direction for each screen object in at least one screen object to display the screen object in a casual view on the touch screen 12, where each screen object has at least one object size capable of being adjusted, and the object size refers to a magnitude of the screen object displayed on the touch screen 12. Then, in step S220, the touch detecting module 144 uses the touch screen 12 to detect a first touch and a second touch performed on one of the at least one screen object. Finally, in step S230, the object size adjusting module 146 adjusts the object size of the screen object being touched according to a relative moving direction of the first touch and the second touch and the display direction of the screen object being touched. To be specific, when a pinch-out gesture (i.e. two fingers touch the object and move away from each other) is detected within the screen object, the object size of the screen object is enlarged according to the moving distance of the fingers. On the contrary, when a pinch-in gesture (i.e. two fingers touch the object and move toward each other) is detected within the screen object, the object size of the screen object is reduced according to the moving distance of the fingers. In the casual view mode, when a pinch-out gesture (i.e. two fingers touch of the object and move away from each other) is detected on the page but is not both within an object, the casual view of the page is switched to an organized view. In the organized view, all of the object in the page are finely arranged in a compressed page so as to enable the user to quickly browse all objects in the casual view. The objects is rolled back to a basic size and fit in the slots in the compressed page. A tap performed on any object shall trigger a second layer or an action of the object. A drag-and-drop gesture performed on any object shall move the object. A pinch-in gesture (i.e. two fingers touch the object and move toward each other) shall switch the organized view back to the casual view.

Figure 3:
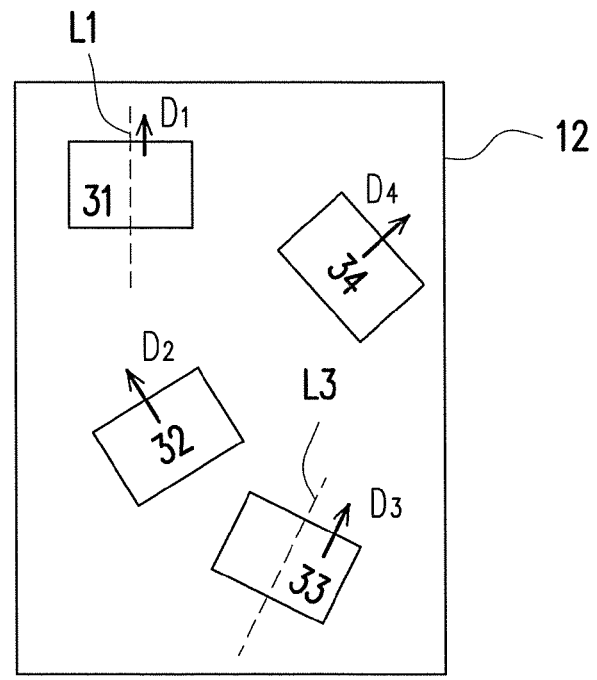
FIG. 3 is a schematic diagram of an example of randomly selecting a display direction to display a screen object according to an embodiment of the invention.

FIG. 3 is a schematic diagram of an example of randomly selecting a display direction to display a screen object according to an embodiment of the invention. Referring to FIG. 3, in this example, the object display module 142 randomly selects display directions $D_1$-$D_4$ for the screen objects 31-34, and displays the screen objects 31-34 on the touch screen 12. In detail, the display direction selected by the object display module 142 is a direction parallel to a vertical midline of the screen object. Taking the screen object 31 as an example, after the object display module 142 randomly selects the display direction $D_1$, the object display module 142 displays the screen object 31 on the touch screen 12 in a manner that a vertical midline $L_1$ of the screen object 31 is parallel to the display direction $D_1$. Alternatively, shown as the screen object 33, a vertical midline $L_3$ thereof is parallel to the display direction $D_3$ randomly selected by the object display module 142.

In the embodiment of FIG. 3, the screen objects 31-34 displayed on the touch screen 12 have different display directions $D_1$-$D_4$. However, in other embodiments, the screen objects displayed on the touch screen 12 probably have the same or different display directions. Namely, the display direction of each screen object is randomly selected by the object display module 142, and any direction is considered to be within the scope of the invention.

Figures 4A, 4B:
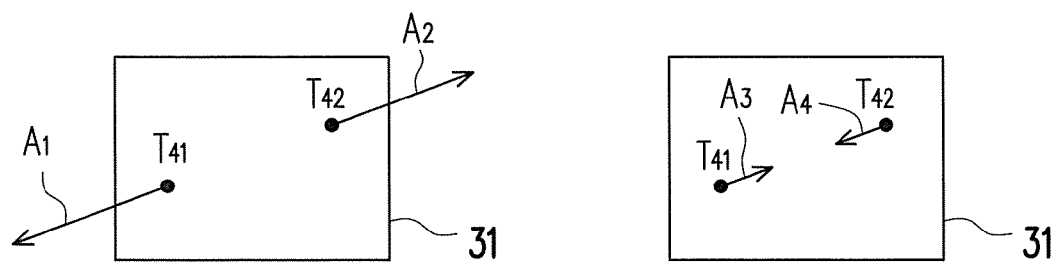
FIGS. 4A and 4B are diagrams illustrating examples of a method for adjusting size of screen object according to an embodiment of the invention.

In the following content, adjustment of the object size of the screen object 31 is taken as an example for descriptions. As shown in FIG. 4A, when the touch detecting module 144 uses the touch screen 12 to detect a first touch $T_{41}$ and a second touch $T_{42}$ performed on the screen object 31, if the first touch $T_{41}$ and the second touch $T_{42}$ respectively move along a direction away from each other (for example, directions shown by arrows $A_1$ and $A_2$), the object size adjusting module 146 enlarges the object size of the screen object 31. As shown in FIG. 4B, when the touch detecting module 144 uses the touch screen 12 to detect the first touch $T_{41}$ and the second touch $T_{42}$ performed on the screen object 31, if the first touch $T_{41}$ and the second touch $T_{42}$ respectively move along a direction facing to each other (for example, directions shown by arrows $A_3$ and $A_4$), the object size adjusting module 146 reduces the object size of the screen object 31.

In the above embodiment, once the touch detecting module 144 uses the touch screen 12 to detect a first touch and a second touch performed on a certain screen object, the object size adjusting module 146 adjusts the object size of such screen object according to the relative moving direction of the first touch and the second touch and the display direction of the screen object being touched. However, in another embodiment, the storage unit 14 of the apparatus for adjusting size of screen object 10 further includes an editing module (not shown). The editing module uses the touch screen 12 to detect a third touch performed on one of the screen objects, and determines whether a touch duration of the third touch exceeds a predetermined duration (for example, 1 second, though the invention is not limited thereto), and enters an editing mode when the touch duration of the third touch exceeds the predetermined duration. Only after entering the editing mode, the object size adjusting module 146 adjusts the object size of the screen object according to the relative moving direction of the first touch and the second touch and the display direction of the screen object being touched.

Several embodiments are provided below to describe the method that the object size adjusting module 146 enlarges or reduces the object size of the screen object according to the relative moving direction of the first touch and the second touch and the display direction of the screen object. It should be noticed that when the object size adjusting module 146 enlarges or reduces the object size of the screen object, the object size adjusting module 146 does not change the display direction of the screen object on the touch screen 12.

In an embodiment, it is assumed that the first touch and the second touch performed on the screen object respectively move along a direction away from each other, the object size adjusting module 146 determines whether the direction away from each other is parallel to or vertical to the display direction of the screen object (i.e. determines whether a straight line in the direction along which the first touch and the second touch move away from each other is parallel to or vertical to a straight line in the display direction of the screen object), and determines a manner of enlarging the object size of the screen object according to a determination result.

Figure 5B:
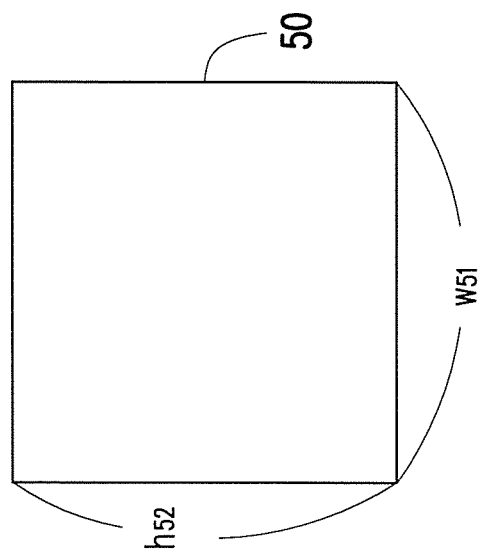
FIGS. 5A, 5B, 5C and 5D are diagrams illustrating examples of a method for adjusting size of screen object according to another embodiment of the invention.
Figure 5A:
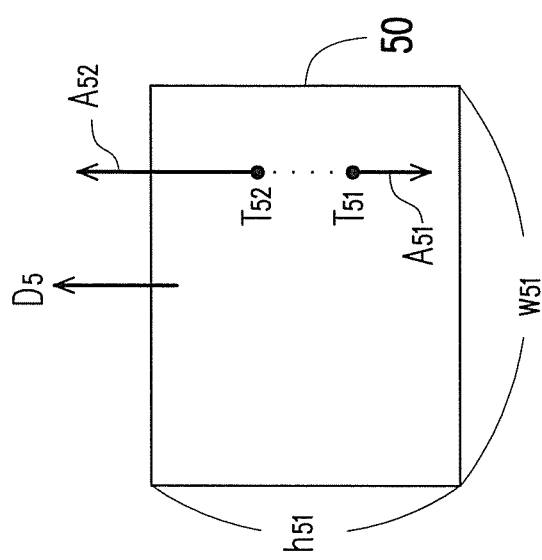

In detail, as that shown in FIG. 5A, it is assumed that a screen object 50 has a height $h_{51}$ and a width $w_{51}$. Since a first touch $T_{51}$ and a second touch $T_{52}$ performed on the screen object 50 respectively move along a direction away from each other (i.e. directions shown by arrows $A_{51}$ and $A_{52}$), and the direction away from each other is parallel to a display direction $D_5$ of the screen object 50, the object size adjusting module 146 only enlarges the object size of the screen object 50 along the display direction $D_5$. In other words, in this example, the object size adjusting module 146 only increases the height of the screen object 50 without adjusting the width thereof. For example, the screen object 50 enlarged by the object size adjusting module 146 is shown in FIG. 5B, in which a height $h_{52}$ thereof is greater than the height $h_{51}$ before the enlargement, though the width $w_{51}$ is maintained unchanged. It should be noticed that the object size adjusting module 146 determines a degree of enlarging the object size of the screen object 50 along the display direction $D_5$ according to a relative moving distance between the first touch $T_{51}$ and the second touch $T_{52}$. For example, the greater the relative moving distance is, the greater degree the screen object 50 is enlarged along the display direction $D_5$.

Figure 5C:
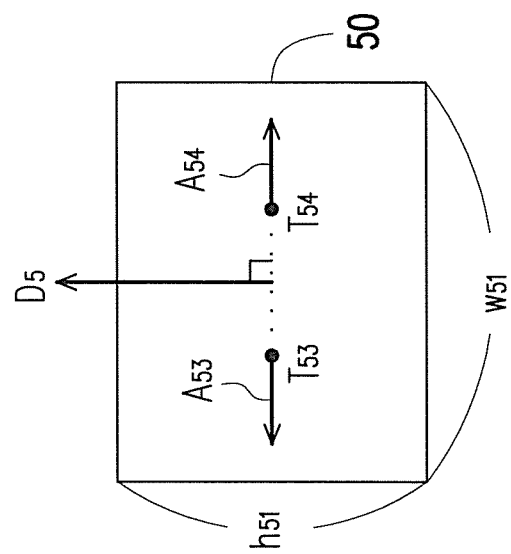
Figure 5D:
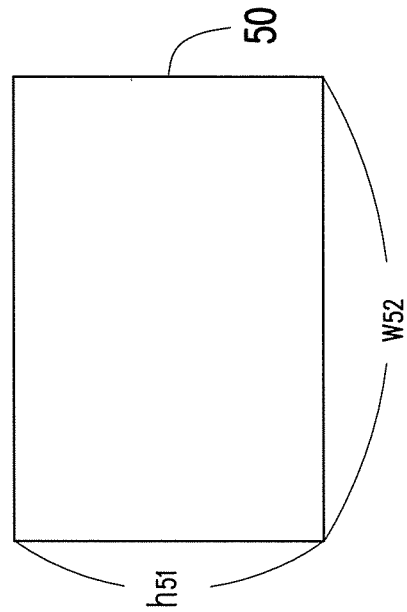

Moreover, referring to FIG. 5C, it is assumed that the first touch $T_{53}$ and the second touch $T_{54}$ performed on the screen object 50 respectively move along a direction away from each other (i.e. directions shown by arrows $A_{53}$ and $A_{54}$), and the direction away from each other is vertical to the display direction $D_5$ of the screen object 50, the object size adjusting module 146 only enlarges the object size of the screen object 50 along a vertical direction of the display direction $D_5$. In other words, in this example, the object size adjusting module 146 only increases the width of the screen object 50 without adjusting the height thereof. As that shown in FIG. 5D, after the screen object 50 is enlarged by the object size adjusting module 146, a width $w_{52}$ thereof is greater than the weight $w_{51}$ before the enlargement, though the height $h_{51}$ is maintained unchanged. In the present embodiment, the object size adjusting module 146 determines a degree of enlarging the object size of the screen object 50 along the vertical direction of the display direction $D_5$ according to a relative moving distance between the first touch $T_{53}$ and the second touch $T_{54}$. For example, the greater the relative moving distance is, the greater degree the screen object 50 is enlarged along the vertical direction of the display direction $D_5$.

Similarly, it is assumed that the first touch and the second touch performed on the screen object respectively move along a direction facing to each other, the object size adjusting module 146 determines whether the direction facing to each other is parallel to or vertical to the display direction of the screen object, and accordingly determines a manner of reducing the object size of the screen object. In detail, when the direction facing to each other is parallel to the display direction of the screen object, the object size adjusting module 146 only reduces the object size of the screen object along the display direction. When the direction facing to each other is vertical to the display direction of the screen object, the object size adjusting module 146 only reduces the object size of the screen object along the vertical direction of the display direction. A degree of reducing the object size is determined according to a relative moving distance between the first touch and the second touch. For example, the greater the relative moving distance is, the greater degree the screen object is reduced.

In another embodiment, since the relative moving direction of the first touch and the second touch performed on the screen object is not necessarily just parallel to or vertical to the display direction of the screen object, the object size adjusting module 146 enlarges or reduces the object size of the screen object according to components of the relative moving distance between the first touch and the second touch along the display direction and the vertical direction thereof.

Figure 6A:
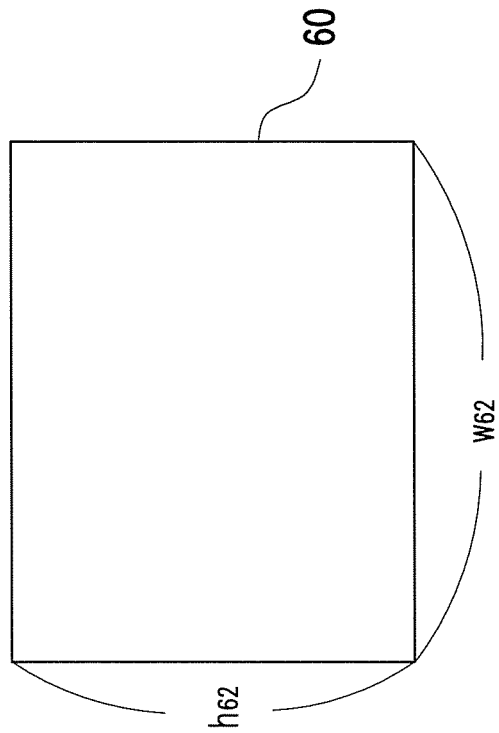
FIGS. 6A and 6B are diagrams illustrating examples of a method for adjusting size of screen object according to still another embodiment of the invention.
Figure 6B:
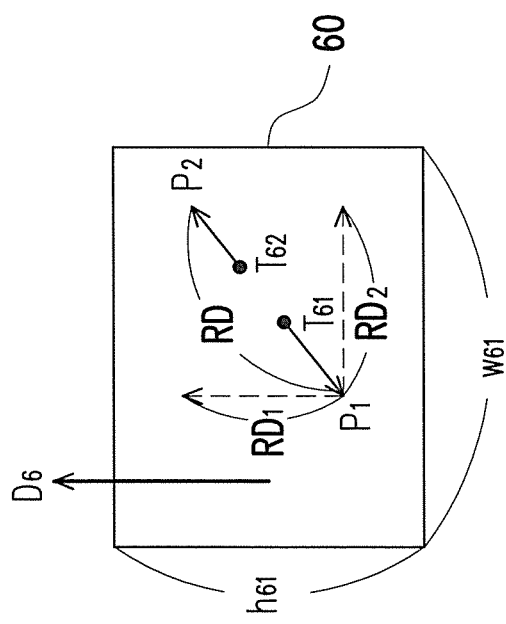

Referring to FIG. 6A, in the present embodiment, a screen object 60 has a width $w_{61}$ and a height $h_{61}$. A first touch $T_{61}$ and a second touch $T_{62}$ performed on the screen object 60 respectively move to a position $P_1$ and a position $P_2$ along a direction away from each other, where a distance between the position $P_1$ and the position $P_2$ is a relative moving distance RD between the first touch $T_{61}$ and the second touch $T_{62}$. Since the direction along which the first touch $T_{61}$ and the second touch $T_{62}$ move away from each other is neither vertical to nor parallel to a display direction $D_6$ of the screen object 60, the object size adjusting module 146 enlarges the object size of the screen object 60 along the display direction $D_6$ of the screen object 60, and enlarges the object size of the screen object 60 along a vertical direction of the display direction $D_6$, where an enlargement degree thereof relates to components of the relative moving distance RD along the above two directions. In detail, the object size adjusting module 146 obtains a first component $RD_1$ of the relative moving distance RD along the display direction $D_6$ to determine a degree of enlarging the object size of the screen object 60 along the display direction $D_6$. The object size adjusting module 146 also obtains a second component $RD_2$ of the relative moving distance RD along the vertical direction of the display direction $D_6$ to determine a degree of enlarging the object size of the screen object 60 along the vertical direction of the display direction $D_6$. For example, the screen object 60 with the object size enlarged by the object size adjusting module 146 is as that shown in FIG. 6B, and the enlarged screen object 60 has a width $w_{62}$ and a height $h_{62}$, where the width $w_{62}$ is greater than the width $w_{61}$ before the enlargement, and the height $h_{62}$ is greater than the height $h_{61}$ before the enlargement.

Similarly, when the first touch and the second touch performed on the screen object respectively move along a direction facing to each other, where if such direction is neither vertical to nor parallel to the display direction of the screen object, the object size adjusting module 146 reduces the object size of the screen object along the display direction according to a first component of the relative moving distance between the first touch and the second touch along the display direction of the screen object, and reduces the object size of the screen object along a vertical direction of the display direction according to a second component of the relative moving distance between the first touch and the second touch along the vertical direction of the display direction of the screen object.

In another embodiment, the screen object displayed on the touch screen has a plurality of predetermined object sizes, and when the object size adjusting module 146 enlarges or reduces the screen object, the object size adjusting module 146 only enlarges or reduces the screen object to one of the predetermined object sizes. Namely, when the object size adjusting module 146 decides to enlarge the screen object, the object size adjusting module 146 determines whether the screen object has other predetermined object sizes larger than the current size, and accordingly enlarges the object size of the screen object. When the object size adjusting module 146 decides to reduce the object size of the screen object, the object size adjusting module 146 determines whether the screen object has other predetermined object sizes smaller than the current size, and accordingly reduces the object size of the screen object.

For simplicity's sake, an object size is represented by a×b, where the value a represents a size of the screen object along the vertical direction of the display direction, and the value b represents a size of the screen object along the display direction. The object size adjusting module 146 determines to enlarge or reduce the object size of the screen object only along the display direction, enlarge or reduce the object size of the screen object only along the vertical direction of the display direction, or enlarge or reduce the object size of the screen object along both of the display direction and the vertical direction thereof according to whether the relative moving direction of the first touch and the second touch performed on the screen object is parallel to or vertical to the display direction. Taking enlarging of the object size as an example, after a direction (which is referred to as a direction to be adjusted hereinafter) along which the object size is enlarged is determined, the object size adjusting module 146 determines whether other predetermined object sizes larger than the current size along the direction to be adjusted exist in all of the predetermined object sizes, and accordingly enlarges the object size of the screen object. When the object size is to be reduced, after a direction (which is referred to as the direction to be adjusted hereinafter) along which the object size is reduced is determined, the object size adjusting module 146 determines whether other predetermined object sizes smaller than the current size along the direction to be adjusted exist in all of the predetermined object sizes, and accordingly reduces the object size of the screen object.

Figure 7:
FIG. 7 is a diagram illustrating an example of an object size according to another embodiment of the invention.

For example, as that shown in FIG. 7, it is assumed that one screen object has 9 predetermined object sizes $S_1$-$S_9$, which are respectively 1×1, 2×1, 3×1, 1×2, 2×2, 3×2, 1×3, 2×3, 3×3, where a minimum object size of the screen object along the display direction is 1, and a maximum object size thereof is 3; and a minimum object size of the screen object along the vertical direction of the display direction is 1, and a maximum object size thereof is 3.

If the current size of the screen object is the object size $S_2$ (i.e. 2×1), when the object size adjusting module 146 decides to enlarge the screen object only along the display direction of the screen object, the object size adjusting module 146 selects to enlarge the screen object to the object size $S_5$ (i.e. 2×2) or the object size $S_8$ (i.e. 2×3) according to the relative moving distance between the first touch and the second touch. When the object size adjusting module 146 decides to enlarge the screen object only along the vertical direction of the display direction of the screen object, the object size adjusting module 146 can enlarge the screen object to the object size $S_3$ (i.e. 3×1). When the object size adjusting module 146 decides to enlarge the screen object along both of the display direction and the vertical direction of the display direction of the screen object, the object size adjusting module 146 selects to enlarge the screen object to the object size $S_6$ (i.e. 3×2) or the object size $S_9$ (i.e. 3×3) according to components of the relative moving distance between the first touch and the second touch along the display direction and the vertical direction of the display direction.

If the current size of the screen object is the object size $S_7$ (i.e. 1×3), when the object size adjusting module 146 decides to enlarge the screen object only along the display direction of the screen object, since the screen object does not have a larger object size along the display direction, the object size adjusting module 146 does not perform the enlarging operation on the object size. However, when the object size adjusting module 146 decides to enlarge the screen object only along the vertical direction of the display direction of the screen object, the object size adjusting module 146 selects to enlarge the screen object to the object size $S_8$ (i.e. 2×3) or the object size $S_9$ (i.e. 3×3) according to the relative moving distance between the first touch and the second touch. When the object size adjusting module 146 decides to enlarge the screen object along both of the display direction and the vertical direction of the display direction of the screen object, since the screen object does not have a larger object size along both of the display direction and the vertical direction of the display direction, the object size adjusting module 146 does not perform enlarging operations on the object size.

If the current size of the screen object is the object size $S_9$ (i.e. 3×3), when the object size adjusting module 146 decides to reduce the screen object only along the display direction of the screen object, the object size adjusting module 146 selects to reduce the screen object to the object size $S_6$ (i.e. 3×2) or the object size $S_3$ (i.e. 3×1) according to the relative moving distance between the first touch and the second touch. When the object size adjusting module 146 decides to reduce the screen object only along the vertical direction of the display direction of the screen object, the object size adjusting module 146 can reduce the screen object to the object size $S_8$ (i.e. 2×3) or the object size $S_7$ (i.e. 1×3) according to the relative moving distance between the first touch and the second touch. When the object size adjusting module 146 decides to reduce the screen object along both of the display direction and the vertical direction of the display direction of the screen object, the object size adjusting module 146 selects to reduce the screen object to the object size $S_1$ (i.e. 1×1), the object size $S_2$ (i.e. 2×1), the object size $S_4$ (i.e. 1×2) or the object size $S_5$ (i.e. 2×2) according to components of the relative moving distance between the first touch and the second touch along the display direction and the vertical direction of the display direction.

In another embodiment, the first touch may be a long press touch, such that the screen object enters an editing mode, and then the object size adjusting module adjusts the object size of the screen object according to the second touch. Compared with the aforementioned size adjusting method, the first touch of the present embodiment is used to activate the object size adjusting module, and the object size adjusting module adjusts the object size of the screen object according to the second touch. Moreover, after activating the object size adjusting module, a prompt may be displayed on the screen object to remind the user that the screen object is suitable for being edited.

It should be noticed that in an actual application, after the object size adjusting module is activated, the object size of the screen object may be adjusted according to the second touch or other touches, and the number of touch according which the object size adjusting module adjusts the object size of the screen object is not limited by the invention.

In the aforementioned embodiment, when the object size adjusting module 146 enlarges or reduces the object size of the screen object, the object size adjusting module further adjusts an object content of the screen object. The object content includes one of a thumbnail, a widget, an operation panel, a image, a video of the screen object or a combination thereof. In other words, besides that the object size of the screen object is changed along with variation of the relative moving direction of the first touch and the second and the display direction of the screen object, the object content can also be accordingly changed.

In detail, one screen object, for example, has 9 predetermined object sizes $S_1$-$S_9$, which are respectively 1×1, 2×1, 3×1, 1×2, 2×2, 3×2, 1×3, 2×3, 3×3, and 9 object contents respectively corresponding to the object sizes $S_1$-$S_9$ may be defined in advance. For example, the screen object represents a weather widget, and when the object size of the screen object is $S_1$, the object content thereof is suitable for being displayed by the object size of 1×1, for example, a software icon of the weather widget. When the object size of the screen object is enlarged to the object size $S_9$, the object content thereof is suitable for being displayed by the object size of 3×3, for example, concrete information of the weather widget (for example, temperatures and climate animation, etc.).

It should be noticed that the corresponding relationship between the object size and the object content may be determined according to an actual requirement, which may be a combination of any corresponding relationships, for example, one-to-one, one-to-many and many-to-one, etc., which is not limited by the invention.

The invention further provides a computer-readable medium, which records a program, and the program is used to execute various steps of the aforementioned method for adjusting size of screen object, and the program is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps of the method for adjusting size of screen object described above.

In summary, according to the method, the apparatus and the computer-readable medium for adjusting size of screen object, the object size of the screen object is adjusted along at least one specific direction according to the relative moving direction of the two touches performed on the screen object and the display direction of the screen object itself, so as to present diversified screen object adjusting effects.

It will be apparent to those skilled in the art that various modifications and variations may be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for adjusting size of screen object, adapted to a mobile device having a touch screen, the method for adjusting size of screen object comprising:
   randomly selecting a display direction for each of at least one screen object to display each of the at least one screen object in a casual view on the touch screen, wherein each of the at least one screen object has at least one object size capable of being adjusted;
   detecting a first touch and a second touch by using the touch screen and determining whether the first touch and the second touch are both within one of the at least one screen object;
   in response to the first touch and the second touch being both within the one of the at least one screen object, enlarging the object size of the screen object being touched when the first touch and the second touch respectively move along a direction away from each other, and reducing the object size of the screen object being touched when the first touch and the second touch respectively move along a direction facing to each other; and
   in response to the first touch and the second touch being not both within the one of the at least one screen object, switching to display the at least one screen object from the casual view to an organized view when the first touch and the second touch respectively move along the direction away from each other, and switching to display the at least one screen object from the organized view to the casual view when the first touch and the second touch respectively move along the direction facing to each other, wherein all of the at least one screen object is arranged in a compressed page in the organized view, wherein the step of switching to display the at least one screen object in the organized view comprises:
   rolling the at least one screen object back to a predetermined size to fit in a plurality of slots in the compressed page, wherein the plurality of slots are respectively arranged in a predetermined and fixed position in the compressed page.

2. The method for adjusting size of screen object as claimed in claim 1, wherein before the step of enlarging the object size of the screen object being touched when the first touch and the second touch respectively move along a direction away from each other, or reducing the object size of the screen object being touched when the first touch and the second touch respectively move along a direction facing to each other, the method further comprises:
   detecting a third touch performed on one of the at least one screen object by using the touch screen, and determining whether a touch duration of the third touch exceeds a predetermined duration; and
   entering an editing mode when the touch duration of the third touch exceeds the predetermined duration, and then enlarging the object size of the screen object being touched when the first touch and the second touch respectively move along a direction away from each other, or reducing the object size of the screen object being touched when the first touch and the second touch respectively move along a direction facing to each other.

3. The method for adjusting size of screen object as claimed in claim 1, wherein the step of enlarging or reducing the object size of the screen object being touched further comprises:
   adjusting an object content of the screen object being touched, wherein the object content comprises one or combination of a thumbnail, a widget, an operation panel, an image, and a video of the screen object being touched.

4. The method for adjusting size of screen object as claimed in claim 1, wherein the step of randomly selecting the display direction for each of the at least one screen object to display each of the at least one screen object on the touch screen comprises:
   randomly selecting the display direction for each of at least one screen object and generating a page comprising the at least one screen object placed in the selected display direction; and
   displaying a portion of the page, wherein the page is scrollable to seamlessly display other portions of the page and each of the at least one screen object comprised in the displayed portion of the page is fully displayed or partially displayed.

5. The method for adjusting size of screen object as claimed in claim 4, wherein the step of enlarging or reducing the object size of the screen object being touched comprises:
   adjusting the object size of the screen object being touched according to a simultaneous detection of the first touch and the second touch, a change of displacement between the first touch and the second touch, and the display direction of the screen object being touched, at least by:
  enlarging or reducing the object size of the screen object being touched along the display direction according to a first displacement component of the change of displacement between the first touch and the second touch, wherein the first displacement component is in the display direction; and
  enlarging or reducing the object size of the screen object being touched along an orthogonal direction to the display direction according to a second displacement component of the change of displacement between the first touch and the second touch, wherein the second displacement component is in the orthogonal direction.

6. The method for adjusting size of screen object as claimed in claim 5, wherein the step of enlarging or reducing the object size of the screen object being touched comprises:
  when enlarging the object size of the screen object being touched, determining whether the screen object being touched has the object size larger than a current size and accordingly enlarging the object size of the screen object being touched; and
  when reducing the object size of the screen object being touched, determining whether the screen object being touched has the object size smaller than the current size and accordingly reducing the object size of the screen object being touched.

7. An apparatus for adjusting size of screen object, comprising:
  a touch screen;
  a storage unit, recording a plurality of modules; and
  one or more processing units, coupled to the touch screen and the storage unit, and accessing and executing the modules recorded in the storage unit, wherein the modules comprise:
    an object display module, randomly selecting a display direction for each of at least one screen object to display each of the at least one screen object in a casual view on the touch screen, wherein each of the at least one screen object has at least one object size capable of being adjusted;
    a touch detecting module, using the touch screen to detect a first touch and a second touch and determine whether the first touch and the second touch are both within one of the at least one screen object;
    an object size adjusting module, enlarging the object size of the screen object being touched when the first touch and the second touch respectively move along a direction away from each other, and reducing the object size of the screen object being touched when the first touch and the second touch respectively move along a direction facing to each other in response to the first touch and the second touch being both within the one of the at least one screen object, wherein
      the object display module further comprises switching to display the at least one screen object from the casual view to an organized view when the first touch and the second touch respectively move along the direction away from each other, and switching to display the at least one screen object from the organized view to the casual view when the first touch and the second touch respectively move along the direction facing to each other in response to the first touch and the second touch being not both within the one of the at least one screen object, wherein all of the at least one screen object is arranged in a compressed page in the organized view, wherein
      the object display module further comprises rolling the at least one screen object back to a predetermined size to fit in a plurality of slots in the compressed page, and wherein the plurality of slots are respectively arranged in a predetermined and fixed position in the compressed page.

8. The apparatus for adjusting size of screen object as claimed in claim 7, further comprising:
  an editing module, using the touch screen to detect a third touch performed on one of the at least one screen object, determining whether a touch duration of the third touch exceeds a predetermined duration, and entering an editing mode when the touch duration of the third touch exceeds the predetermined duration, and then enlarging the object size of the screen object being touched when the first touch and the second touch respectively move along a direction away from each other, or reducing the object size of the screen object being touched when the first touch and the second touch respectively move along a direction facing to each other.

9. The apparatus for adjusting size of screen object as claimed in claim 7, wherein the object size adjusting module further adjusts an object content of the screen object being touched, wherein the object content comprises one or combination of a thumbnail, a widget, an operation panel, an image, and a video of the screen object being touched.

10. The apparatus for adjusting size of screen object as claimed in claim 7, wherein the object display module further comprises generating a page comprising the at least one screen object placed in a randomly selected display direction, and displaying a portion of the page, wherein the page is scrollable to seamlessly display other portions of the page and each of the at least one screen object comprised in the displayed portion of the page is fully displayed or partially displayed.

11. The apparatus for adjusting size of screen object as claimed in claim 10, wherein the object size adjusting module comprises adjusting the object size of the screen object being touched according to a simultaneous detection of the first touch and the second touch, a change of displacement between the first touch and the second touch, and the display direction of the screen object being touched, at least by:
  enlarging or reducing the object size of the screen object being touched along the display direction according to a first displacement component of the change of displacement between the first touch and the second touch, wherein the first displacement component is in the display direction; and
  enlarging or reducing the object size of the screen object being touched along an orthogonal direction to the display direction according to a second displacement component of the change of displacement between the first touch and the second touch, wherein the second displacement component is in the orthogonal direction.

12. The apparatus for adjusting size of screen object as claimed in claim 11, wherein when the object size adjusting module enlarges the object size of the screen object being touched, the object size adjusting module determines whether the screen object being touched has the object size larger than a current size and accordingly enlarges the object size of the screen object being touched, and when the object size adjusting module reduces the object size of the screen object, the object size adjusting module determines whether the screen object being touched has the object size smaller than the current size and accordingly reduces the object size of the screen object being touched.

13. A non-transient computer-readable medium, recording a program, and the program being loaded to a mobile device to execute following steps:

randomly selecting a display direction for each of at least one screen object to display each of the at least one screen object in a casual view on the touch screen, wherein each of the at least one screen object has at least one object size capable of being adjusted;

detecting a first touch and a second touch by using the touch screen and determining whether the first touch and the second touch are both within one of the at least one screen object;

in response to the first touch and the second touch being both within the one of the at least one screen object, enlarging the object size of the screen object being touched when the first touch and the second touch respectively move along a direction away from each other, and reducing the object size of the screen object being touched when the first touch and the second touch respectively move along a direction facing to each other; and in response to the first touch and the second touch being not both within the one of the at least one screen object, switching to display the at least one screen object from the casual view to an organized view when the first touch and the second touch respectively move along the direction away from each other, and switching to display the at least one screen object from the organized view to the casual view when the first touch and the second touch respectively move along the direction facing to each other, wherein all of the at least one screen object is arranged in a compressed page in the organized view, wherein the step of switching to display the at least one screen object in the organized view comprises:

rolling the at least one screen object back to a predetermined size to fit in a plurality of slots in the compressed page, wherein the plurality of slots are respectively arranged in a predetermined and fixed position in the compressed page.

14. The non-transient computer-readable medium as claimed in claim 13, wherein the step of randomly selecting the display direction for each of the at least one screen object to display each of the at least one screen object on the touch screen comprises:

randomly selecting a display direction for each of at least one screen object and generating a page comprising the at least one screen object placed in the selected display direction; and displaying a portion of the page, wherein the page is scrollable to seamlessly display other portions of the page and each of the at least one screen object comprised in the displayed portion of the page is fully displayed or partially displayed.

* * * * *